United States Patent
Tozuka et al.

(10) Patent No.: US 6,740,990 B2
(45) Date of Patent: May 25, 2004

(54) COMPULSORY DRIVE UNIT FOR ELECTRICAL EQUIPMENT IN A VEHICLE

(75) Inventors: Yuji Tozuka, Aichi (JP); Yuji Kamiya, Aichi (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 433 days.

(21) Appl. No.: 09/742,105

(22) Filed: Dec. 22, 2000

(65) Prior Publication Data

US 2001/0023379 A1 Sep. 20, 2001

(30) Foreign Application Priority Data

Dec. 27, 1999 (JP) .............................. 11-370356

(51) Int. Cl.$^7$ ................................. B60L 1/00
(52) U.S. Cl. ................... 307/9.1; 439/900; 324/503
(58) Field of Search ................. 307/9.1, 10.1, 307/125, 132 E; 439/76.2, 949, 900, 952; 324/503, 538, 555

(56) References Cited

U.S. PATENT DOCUMENTS

| | | | | |
|---|---|---|---|---|
| 4,963,099 A | * | 10/1990 | Sato et al. | 439/76.2 |
| 5,949,148 A | * | 9/1999 | Wagner | 307/10.1 |
| 6,124,716 A | * | 9/2000 | Kanamori | 324/538 |

* cited by examiner

Primary Examiner—Gregory J Toatley, Jr.
(74) Attorney, Agent, or Firm—Birch, Stewart, Kolasch & Birch, LLP

(57) ABSTRACT

A compulsory drive unit (1) for electrical equipment provided in a vehicle is capable of easily and compulsorily driving the electrical equipment (11) in the vehicle to check the operation thereof. The compulsory drive unit (1) brings a power supply unit (30) into contact with a bus bar (21) through a conduction hole (2c) of a junction block (2) to thereby supply the electrical equipment with power from an outside battery (+B) and compulsorily drive the electrical equipment. It is therefore possible to easily check the operation of the electrical equipment, and this significantly improves the operating efficiency.

8 Claims, 2 Drawing Sheets

COMPULSORY DRIVE UNIT FOR ELECTRICAL EQUIPMENT IN A VEHICLE

BACKGROUND OF THE INVENTION

1. Field of the Invention

The present invention relates to a compulsory drive unit, which is able to easily and compulsorily drive electrical equipment provided in a vehicle in order to check operation of electrical equipment.

2. Description of Related Art

A vehicle is equipped with a variety of electrical equipments such as a fuel pump, power windows, window washer, windshield wipers, and lamps. Each electrical equipment is connected to a battery through a harness and a junction block. The junction block is connected to a connector of the harness through a connecting terminal. The junction block is provided with bus bars, which are arranged in correspondence with the electrical equipment. These bus bars are provided with circuit elements such as a fuse and a relay. Conventionally, the electrical equipment is checked by using electrical circuits and connectors of a harness and the like, which are specially provided in a vehicle, in order to check operation of electrical equipment such as a fuel pump and circuits on an assembly line, at dealers and the like. Alternatively, the electrical equipment is checked by detaching a relay from a fuel pump motor circuit (drive circuit) and compulsorily supplying power to a connector of the fuel pump motor circuit.

If, however, the electrical equipment is checked by using the electrical circuits and connectors that are specially provided in the vehicle; costs for providing such circuits and connectors will be high and there are problems with respect to the installation space of the connectors, fixing means thereof, and the wiring of the harness and the like. On the other hand, if the relay is detached from the fuel pump motor circuit and power is supplied to the connector of the fuel pump motor circuit, peripheral parts must be detached depending on the attachment position of the relay. This requires a lot of effort.

SUMMARY OF THE INVENTION

It is therefore an object of the present invention to provide a compulsory drive unit for electrical equipment installed in a vehicle. This compulsory drive unit is capable of easily and compulsorily driving electrical equipment provided in the vehicle in order to check their operation of the electrical equipment.

The above object can be accomplished by forming a conduction hole in a junction block at such a position as to supply a bus bar with power from an outside battery. This makes it possible to easily supply the bus bar with power from an outside battery and electrically connect the battery with the electrical equipment. This compulsorily drives the electrical equipment.

The above object can also be accomplished by operating a switch disposed between the battery and the bus bar in order to check the operation of the electrical equipment to thereby form a short circuit between the battery and the bus bar and supply the electrical equipment with power to compulsorily drive it. It is therefore possible to easily check the operation of the electrical equipment.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of the present invention will be described in further detail with reference to the accompanying drawings.

Figure 1:
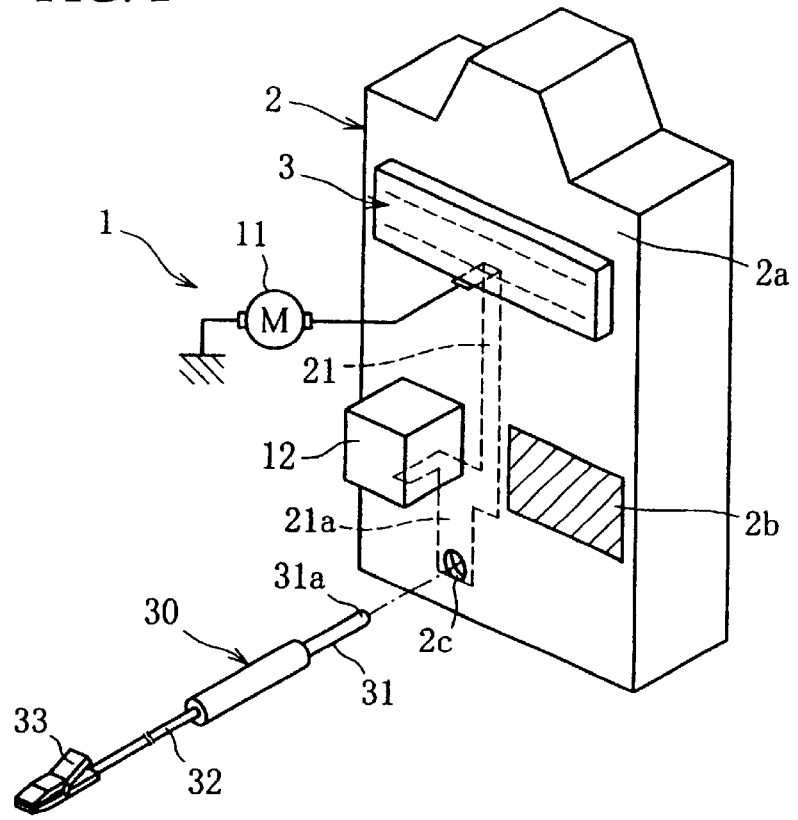
FIG. 1 is a schematic perspective diagram showing a compulsory drive unit for electrical equipment in a vehicle according to the present invention.
Figure 2:
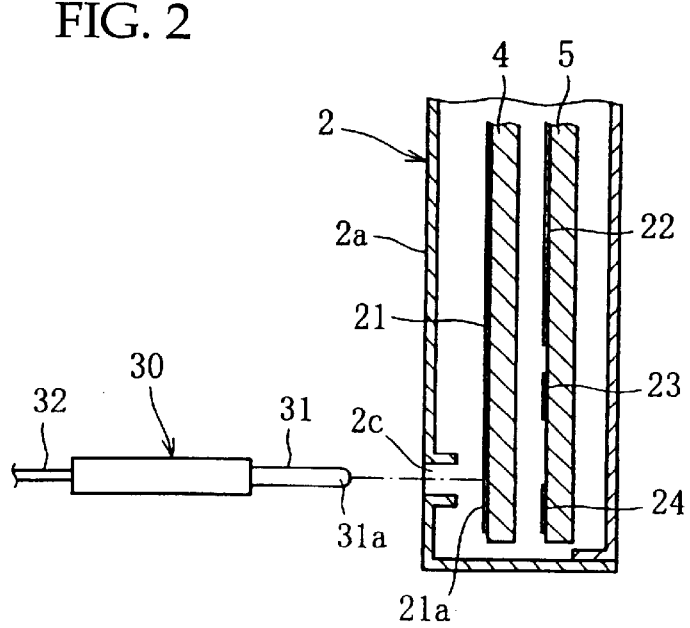
FIG. 2 is a sectional view showing a principal part of the compulsory drive unit for the electrical equipment in the vehicle in FIG. 1.

FIG. 1 is a schematic perspective diagram showing a compulsory drive unit for electrical equipment installed in a vehicle according to the present invention. FIG. 2 is a sectional view showing the principal part of FIG. 1. As shown in FIG. 1, a junction block 2 of the compulsory drive unit 1 for the electrical equipment installed in the vehicle (hereinafter referred to only as "compulsory drive unit") is provided in the vehicle. The junction block 2 is disposed between a battery as a power supply for the vehicle and a variety of electrical equipment such as a fuel pump, power windows, a window washer, wipers, and lamps through a harness (none of which are shown in the drawing). A connector 3, which is capable of connecting to the variety of electrical equipment, is provided at the upper part of a front face 2a of the junction block 2. For example, the connector 3 connects to a pump motor 11 as a drive means for the fuel pump. The other electrical equipment and drive means therefore are not shown in the drawing. A relay 12, as a drive circuit for the pump motor 11, is attached to the lower part of the junction block 2 through a connector (not shown). There is a fuse area 2b (indicated by diagonal lines) next to the relay 12. In the fuse area 2b, fuse connectors that correspond to the electrical equipment (none of which are shown in the drawing) are provided. The junction block 2 is made of resin.

Figure 3:
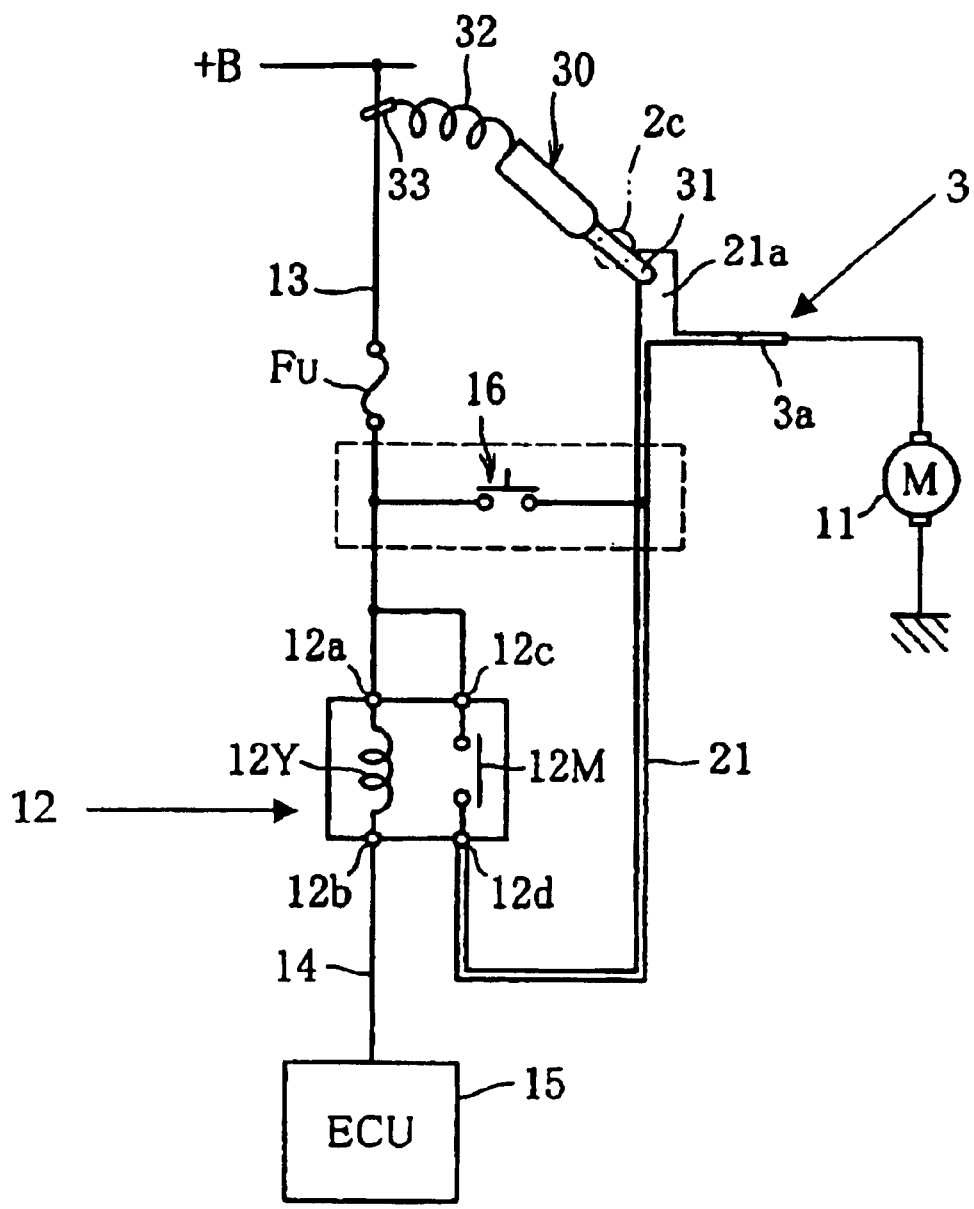
FIG. 3 is an explanation drawing showing a compulsory drive circuit in the compulsory drive unit for the electrical equipment in the vehicle in FIG. 1.

As shown in FIG. 2, the junction block 2 contains two insulating substrates 4 and 5 facing each other. Bus bars 21–24 that correspond to the electrical equipment are provided. For example, the bus bar 21 corresponding to the motor 11 of the fuel pump is provided on the insulating substrate 4, which faces front face 2a of the junction block 2. FIG. 3 shows an example of the drive circuit, which is provided on the substrate 4, for the pump motor 11. In the relay 12, one end of a coil 12Y connects to a battery +B through a terminal 12a and a wire 13. The other end of the coil 12Y connects to an electronic control unit (ECU) 15 through a terminal 12b and a wire 14. One terminal 12c of a contact 12M connects to the wire 13, and the other terminal 12d connects to one end of the bus bar 21. The other end of the bus bar 21 connects to a terminal 3a of the connector 3. The electronic control unit 15 turns an electric current on and off carried through the coil 12Y of the relay 12 to thereby or control the relay contact 12M.

A conduction hole 2c is formed in proximity to the fuse below the relay 12 in such a manner as to face the substrate 4, and a contact part 21a is integrally formed in the bus bar 21 of the substrate 4 in such a manner as to face the conduction hole 2c. A power supply rod 31 functions as a power supply unit for supplying the contact part 21a with power from the outside battery +B, and the power supply rod 31 can be inserted into the conduction hole 2c. A clip 33, for example, is connected to the other end of the power supply tester 30 through a lead wire 32 so a power supply tester 30 can be connected to the outside battery +B. The conduction hole 2c may be kept either opened or closed by a rubber plug.

To confirm (check) the driven state of the fuel pump, the lead wire 32 of the power supply tester 30 is connected to the outside battery +B through the clip 33, and the power supply rod 31 is inserted into the conduction hole 2c of the junction block 2. An end 31a of the power supply rod 31 is brought into contact with the contact part 21a of the bus bar 21 so that the power supply rod 31 can electrically connect to the bus bar 21. Therefore, the pump motor 11 is supplied with power from the outside battery +B to be driven compulsorily even if the relay 12 is off. The pump motor 11 therefore drives the fuel pump. Taking into consideration the case where the pump motor 11 is short-circuited, the lead wire 32 of the power supply tester 30 may be connected to the downstream side of a fuse Fu connected to the wire 13.

A conduction hole 2c is formed in proximity to the fuse, and this makes it possible to simultaneously check the driven state of the fuel pump and visually check the connection and disconnection of the fuse of the pump motor 11. This improves the operating efficiency. Moreover, the driven state of the fuel pump can be checked without detaching other electrical parts such as the relay from the junction block 2. This eliminates the necessity of attaching and detaching these electrical parts, and improves the operating efficiency. The provision of the fuse in proximity to the bus bar 21 miniaturizes the bus bar and simplifies the structure of the compulsory drive unit. This reduces weight of the compulsory drive unit and lowers costs.

In FIG. 3, an area enclosed by dotted lines indicates another embodiment of the present invention. More specifically, instead of forming the conduction hole 2c in the junction block 2 and providing the contact part 21a in the bus bar 21 correspondingly to the conduction hole 2c, a push button switch 16, for example, is disposed between the wire 13 and the bus bar 21 to bypass the relay contact 12M.

If the switch 16 is closed in order to check the driven state of the fuel pump, the power is supplied to the pump motor 11 from the outside battery +B with the contact 12M being bypassed. Thus, mere depression of the switch 16 compulsorily drive the pump motor 11 to run the fuel pump.

In the above embodiments, the fuel pump is given as an example of the electrical equipments that are compulsorily driven in order to check the operation. The present invention, however, should not be restricted to the fuel pump. It is needless to say that the present invention may also be applied to other electrical equipments such as a power window, a window washer, a wiper, and a lamp.

According to one embodiment of the present invention, only bringing the power supply unit into contact with the bus bar through the conduction hole of the junction block supplies the electrical equipment with power and compulsorily drive the electrical equipment. It is therefore possible to easily check the operation of the electrical equipment, and this significantly improves the operating efficiency. The compulsory drive unit of the present invention has a simple structure comprised of the junction block and the bus bar. Moreover, there is no necessity of providing the connectors, the harness and the like for use in the check of the operation, and this lowers the costs and simplifies the peripheral area of the junction block.

According to another embodiment of the present invention, the mere depression of the switch compulsorily drives the electrical equipment. It is therefore possible to easily check the operation of the electrical equipment and simplify the structure of the drive unit.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A compulsory drive unit for electrical equipment in a vehicle, comprising:

a junction block provided in the vehicle, said junction block having a conduction hole that allows an electrical connecting from an outside to an inside of said junction block;

a bus bar provided in said junction block, said bus bar being electrically connected to the electrical equipment; and a power supply unit that selectively makes contact with said bus bar through said conduction hole to thereby supply the electrical equipment with electrical power, said power supply unit including a power supply rod provided at a first end thereof and adapted to be inserted into said conduction hole, and a clip provided at a second end thereof and adapted to be connected to the power supply unit through a lead wire wherein said conduction hole is formed at such a position as to supply said bus bar with electrical power directly to said bus bar through said conduction hole.

2. A compulsory drive unit for electrical equipment in a vehicle according to claim 1, further comprising:

a relay, one end of which being connected to a battery and another end of which being connected to the electrical equipment for selectively providing electrical power to the electrical equipment, wherein said power supply unit bypasses said relay to supply said electrical equipment directly with electrical power.

3. A compulsory drive unit for electrical equipment in a vehicle according to claim 1, further comprising:

a fuse arranged between a battery and the electrical equipment, said fuse being located in close proximity to said bus bar.

4. A compulsory drive unit for electrical equipment in a vehicle according to claim 1, further comprising:

a fuse arranged between a battery and the electrical equipment, wherein said power supply unit connects said battery with said bus bar at a downstream side of said fuse.

5. A compulsory drive unit for electrical equipment in a vehicle, comprising:

a junction block provided in said vehicle;

a bus bar provided in said junction block, said bus bar being electrically connected to the electrical equipment provided in said vehicle; and a switch disposed between said bus bar and a battery connected thereto, said switch adapted to form a short circuit between the battery and said bus bar.

6. A compulsory drive unit for electrical equipment in a vehicle according to claim 5, further comprising:

a relay, a first end of which being connected to the battery and a second end of which being connected to the electrical equipment for selectively providing electrical power to the electrical equipment, wherein said switch bypasses the relay.

7. A compulsory drive unit for electrical equipment in a vehicle according to claim 5, further comprising:

a fuse arranged between the battery and the electrical equipment, said fuse being located in close proximity to said bus bar.

8. A compulsory drive unit for electrical equipment in a vehicle according to claim 5, further comprising:

a fuse arranged between the battery and the electrical equipment, wherein said switch selectively connects the battery with the bus bar at a downstream side of said fuse.

* * * * *